United States Patent [19]

Swinton

[11] 4,206,557

[45] Jun. 10, 1980

[54] TEACHING SYSTEM EMPLOYING BINARY LIGHT-SENSITIVE RESPONDERS

[75] Inventor: Spencer S. Swinton, Morrisville, Pa.

[73] Assignee: Educational Testing Service, Princeton, N.J.

[21] Appl. No.: 872,814

[22] Filed: Jan. 27, 1978

[51] Int. Cl.² .......................................... G09B 7/073
[52] U.S. Cl. .................................................. 35/9 B
[58] Field of Search ..................... 35/9 B, 9 A, 48 R; 358/146; 340/146.2

[56] References Cited

U.S. PATENT DOCUMENTS

| | | | |
|---|---|---|---|
| 2,564,089 | 8/1951 | Williams et al. | 35/9 B |
| 3,077,038 | 2/1963 | Williams et al. | 35/9 B |
| 3,095,653 | 7/1963 | Corrigan | 35/9 B |
| 3,777,410 | 12/1973 | Robinson | 35/9 B |
| 3,784,979 | 1/1974 | Friedman et al. | 340/146.2 |
| 3,848,082 | 11/1974 | Summers | 358/146 |

FOREIGN PATENT DOCUMENTS 1964702  7/1970  Fed. Rep. of Germany ............ 35/9 A Primary Examiner—William H. Grieb
Attorney, Agent, or Firm—Shenier & O'Connor

[57] ABSTRACT

In a teaching system, a television screen displays a question calling for one of four possible answers, together with one or a pair of dots of light at locations illuminated in a binary pattern indicating the correct answer. Optical sensors detachably secured to the television receiver screen at the locations and concealing the same from view feed a pair of binary signals to a logic decoder. The decoder provides an output signal over one of four output lines to a number of student-actuated responder units, each of which includes four switches for selecting an answer and a lamp that is illuminated to indicate the selection of a correct answer. In an alternative embodiment, each responder unit is disabled after the switches are first actuated to select an answer and is re-enabled only after receiving a reset signal from an additional optically sensed screen dot at the beginning of the next response period.

4 Claims, 6 Drawing Figures

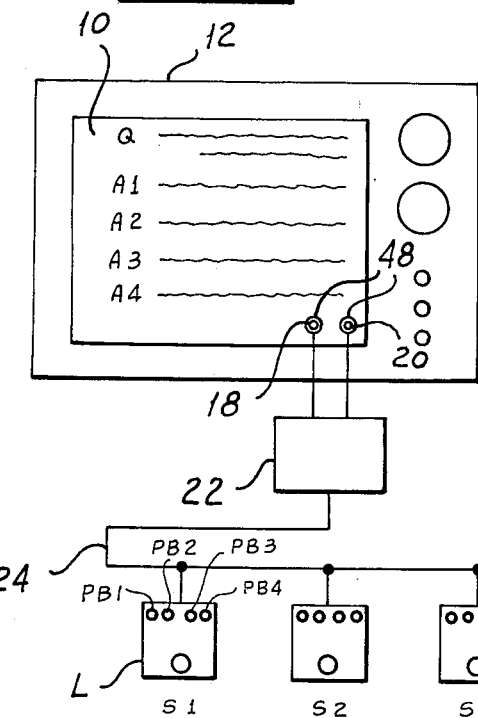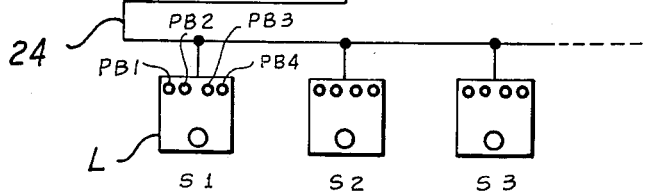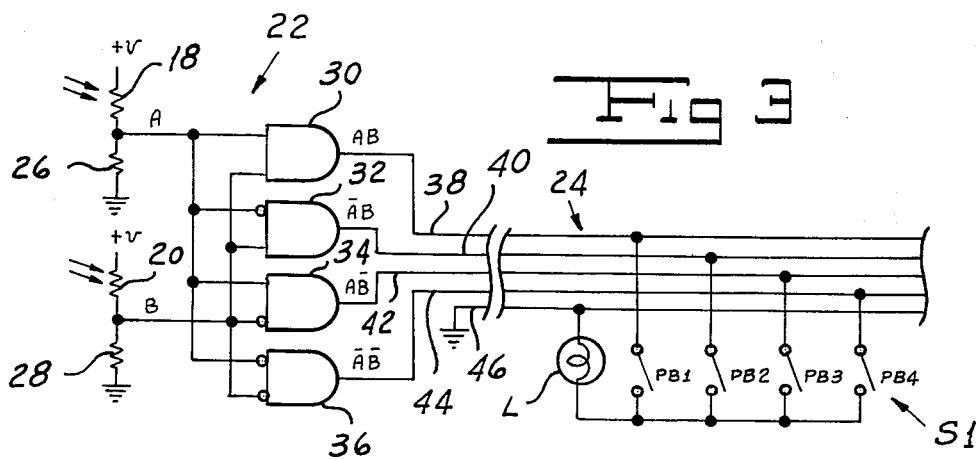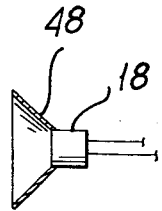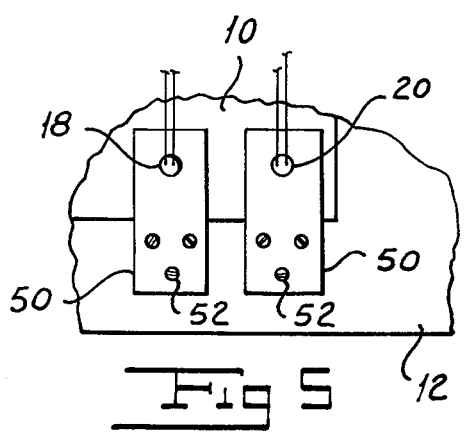

TEACHING SYSTEM EMPLOYING BINARY LIGHT-SENSITIVE RESPONDERS

BACKGROUND OF THE INVENTION

Teaching systems in which students are provided questions on a screen and are asked to provide answers through a keyboard are well-known in the art. In one such system, disclosed by J. Laplume in German Patent Application 1964702, each successive frame of a paper band moved past a viewing window contains a printed question posed to an individual student. The frame also contains, on a portion not exposed to view, the correct answer in parallel encoded form as a pattern of light and dark areas. In the system described, five areas are used to indicate one of up to 32 possible answers. The student selects an answer by actuating the appropriate key of a keyboard, the output of the keyboard being encoded as a parallel five-line signal. This signal is compared with another five-line signal obtained by optically sensing the frame areas to determine whether the selected answer is the correct answer. Systems such as this have the drawback that they are not adapted to simultaneous use by a number of students. Moreover, the paper band and associated mechanical and electrical components add to the overall cost.

Summers U.S. Pat. No. 3,848,082 shows an arrangement in which digital information such as a question is presented in serial form at a spot on the screen of an ordinary television receiver and is sensed by an optical transducer positioned adjacent to or remote from the receiver. The sensed information is decoded and presented as some form of visual readout. A digital code representing the correct answer may be transmitted again in serial form to the receiving equipment. A keyboard at the receiver permits the viewer to feed a coded representation of his answer into the system. A comparison of this coded representation with the coded representation of the correct answer can be used to provide an indication of the correctness of the answer. While this arrangement has the advantage of using an existing television receiver to communicate questions and answers, it still suffers the drawback that it is not readily adaptable to use by a number of students without substantial duplication of parts. Further, the serial transmission mode, which is primarily intended for such signals as news and weather reports having high data rates, is a relatively complicated and expensive mode to use for multiple-choice teaching systems having much lower data rates.

SUMMARY OF THE INVENTION

One of the objects of my invention is to provide a teaching system which is readily adaptable to simultaneous use by a number of students.

Another object of my invention is to provide a teaching system which is simple and inexpensive.

Still another object of my invention is to provide a teaching system which may be used with existing equipment.

Other and further objects of my invention will be apparent from the following description.

In general, my system contemplates a teaching system in which an ordinary television screen presents a multiplechoice question together with a binary coded indication of the correct answer in the form of light spots at locations normally concealed from view by optical sensors. A decoder responsive to the sensors puts out a signal on one of a plurality of lines, all of which lead to a plurality of student-operated responders having a selection of switches corresponding to the number of possible answers and a light source which is actuated when a switch connected to a line carrying a correct answer signal is operated. By activating one output of a plurality of outputs corresponding to the possible answers to indicate the correct answer, I greatly simplify the construction of a teaching system used by a number of students, since each student requires only a comparer to determine whether the actuated switch corresponds to the actuated output. In an alternative embodiment, each responder unit is disabled after the switches are first actuated to select an answer and is re-enabled only after receiving a reset signal from an additional optically sensed screen dot at the beginning of the next response period.

The optical sensors are detachably secured to the screen or adjacent structure by means of a bracket, secured by screws or the like, or simply a suction cup placed on the screen over the location. The sensor and securing means should together be large enough to cover the area completely so as to obscure it from view. Such a securing means increases the flexibility of my system by permitting its use with an existing television receiver, for example, with little or no modification.

BRIEF DESCRIPTION OF THE DRAWINGS

In the accompanying drawings to which reference is made in the instant specification and in which like reference characters are used to indicate like parts in the various views:

FIG. 1 is an overall schematic view of one embodiment of my system in use with an ordinary television receiver.

FIG. 2 is a table illustrating the coding pattern used to encode the correct answer.

FIG. 3 is a schematic view of my system.

FIG. 4 is a section of one means used for detachably securing the optical sensors to the television receiver.

FIG. 5 is a front elevation of another means used for detachably securing the optical sensors to the television receiver.

DETAILED DESCRIPTION OF THE PREFERRED EMBODIMENTS

Figure 6:
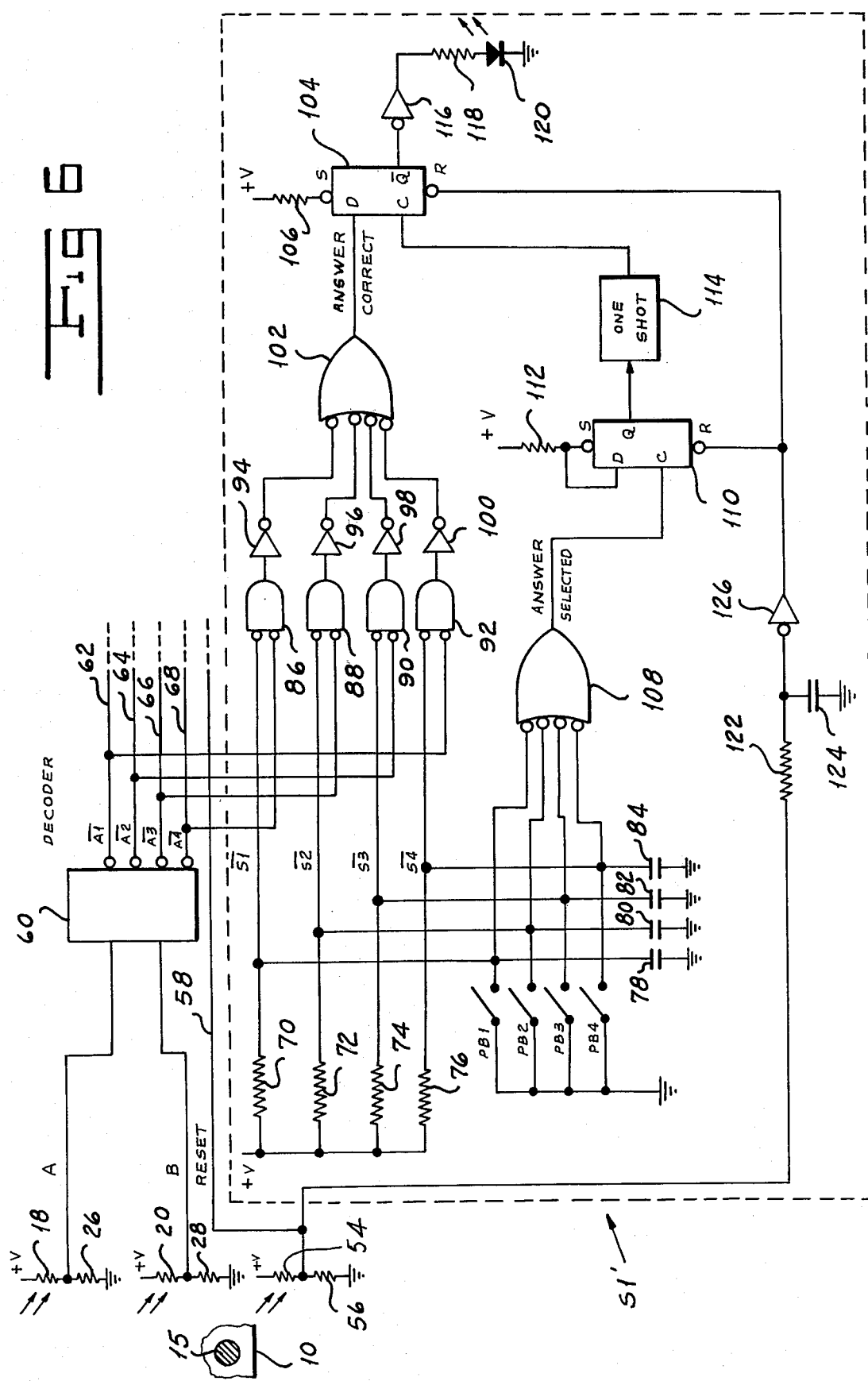
FIG. 6 is a schematic view of an alternative embodiment of my system in which users are inhibited from selecting more than one answer during a given period.

Referring now to FIGS. 1 and 2 of the drawings, my system includes an ordinary television receiver 12, which displays on its screen 10 an image of a card or the like, which is sensed by a television camera (not shown) and transmitted either over a closed circuit or over the air. More particularly, the image displayed on the screen 10 contains a question calling for a choice from among four possible answers A1 through A4, only one of which is the correct answer. In the lower right-hand corner of the display, a pair of dots 14 and 16 are selectively made dark (or light, if the background is dark) in a binary encoded pattern of the number of the correct answer. Specifically, neither dot is dark to indicate that the answer A1 is the correct answer, only dot 14 is dark to indicate that answer A2 is the correct answer, only dot 16 is dark to indicate that answer A3 is the correct answer, and both dots are dark to indicate that answer A4 is the correct answer. The portions of the screen corresponding to the dots 14 and 16 are thus selectively illuminated in a binary coded pattern of the number of the correct answer.

I use a pair of photosensitive elements such as photoelectric cells or photoresistors 18 and 20, the resistances of which vary inversely with the incident illumination, to sense the screen portions displaying the dots 14 and 16. Photoresistors 18 and 20 provide signals to a decoder logic circuit 22 which decodes the signals provided by photoresistors 18 and 20 to produce an output over one line of a multi-channel output line 24 running to a plurality of hand-held selector units, three of which, S1, S2, and S3, are shown. The number of selector units used depends on the number of students able to view the screen simultaneously. About 30 such units may be used with an ordinary television receiver such as the receiver 12.

Each of the selector units S1, S2, and S3 contains four push-button switches PB1 through PB4 which may be pressed by the student to select a possible answer. If the student presses the push-button corresponding to the correct answer, he causes a light L mounted on the selector unit to be lit, thus providing an observable indication that he has selected the correct answer.

Referring now to FIG. 3, I have shown the internal configuration of the logic decoder 22 and of one of the selector units S1. In the decoder circuit 22, photoresistor 18 is coupled to a source of potential +v to form the upper leg of a voltage divider circuit, the lower leg of which is a resistor 26 connected to ground. I so select the values of resistors 18 and 26 that resistor 18 when not illuminated has an appreciably greater resistance than does resistor 26. Thus, an "A" line running from the junction of resistors 18 and 26 carries a relatively high potential when the tube or screen dot 14 sensed by the resistor 18 is illuminated, but provides a signal at or near ground potential when dot 14 is dark. The "A" line is coupled to enabling inputs of AND gates 30 and 34 and to inhibiting inputs of AND gates 32 and 36. Similarly, photoresistor 20 is coupled to the same source of potential to form the upper leg of a voltage divider circuit, the lower leg of which is a resistor 28 connected to ground. Resistor 20 has a magnitude relative to resistor 28 which is the same as that of resistor 18 to resistor 26 so that a "B" line running from the junction of resistors 20 and 28 provides a high output whenever the tube dot 16 sensed by resistor 20 is illuminated, but provides an output at or near ground potential whenever tube dot 16 is dark. The "B" line drives enabling inputs of AND gates 30 and 32 and inhibiting inputs of AND gates 34 and 36.

It will be apparent from the foregoing that AND gate 30 provides a decoded signal AB on line 30 if both tube dots 14 and 16 are illuminated. Similarly gates 32 and 34 provide signals on lines 40 and 42, respectively, if only dot 16 or only dot 14 is illuminated. Finally, AND gate 36 provides a signal on line 44 if neither dot 14 nor dot 16 is illuminated. Lines 38, 40, 42 and 44, together with ground line 46, constitute the multi-channel line 24 running to the various responders S1, S2, and S3.

In each of the selector units S1, S2, and S3, a first push-button switch PB1 is coupled between line 38 and one terminal of a lamp L, the other terminal of which is coupled to the ground line 46. Similarly, push-buttons PB2, PB3 and PB4 are connected between respective lines 40, 42 and 44 and the ungrounded terminal of lamp L. Since an AND gate output appears on one of lines 38, 40, 42 and 44 only if that line corresponds to a correct answer, the student will cause lamp L to be lit only by depressing the push-button corresponding to the correct answer. Each of the gates 30, 32, 34 and 36 of the logic decoder 22 should be sufficiently powerful to drive all of the lamps L in the selector units used.

FIGS. 4 and 5 show alternative means for securing the photoresistors 18 and 20 to the screen 10 in positions to receive light from the corresponding tube dots 14 and 16. In FIG. 4, I show a suction cup 48 having a central aperture which receives the photoresistor 18. The suction cup 48 is sufficiently large to obscure the illuminated area 14 when placed on the screen 10 over that area. In FIG. 5, I show a pair of spaced brackets 50 secured to the television receiver 12 by screws 52 or the like. Like the suction cups 48, brackets 50 are formed with apertures in which are fitted the photoresistors 18 and 20 and are sufficiently large to obscure the illuminated areas when mounted in place thereover.

Referring now to FIG. 6, in an alternative embodiment of my invention the student-actuated keyboards are inhibited after a first actuation to prevent the students from simply actuating the keys in rapid succession to ascertain the correct answer. In this embodiment, I use a third photoresistor 54 to sense a third dot 15 on the screen 10 that is normally dark but is illuminated between questions. Photoresistor 54 forms the upper half of a voltage divider between the +v positive supply line and ground, the lower half of which is provided by a resistor 56. Photoresistor 54 thus provides a high output on reset line 58 whenever screen dot 15 is illuminated between questions.

In the embodiment shown in FIG. 6, I use a decoder 60 similar to the decoder 22 shown in FIGS. 1 and 3, except that the output lines normally carry high outputs but carry low outputs when actuated. Specifically, decoder 60 has an $\overline{A1}$ line 62 for indicating that the answer A1 is the correct answer, an $\overline{A2}$ line 64 for indicating that answer A2 is the correct answer, and $\overline{A3}$ line 66 for indicating that answer A3 is the correct answer, and an $\overline{A4}$ line 68 for indicating that the answer 68 is the correct answer.

Lines 58, 62, 64, 66, and 68 feed a plurality of selector units, one of which, unit S1', is shown. In the selector unit S1', a first push-button switch PB1 is coupled between ground and a resistor 70 coupled to the +v supply line. In a similar manner, I couple switches PB2, PB3, and PB4 between ground and respective resistors 72, 74, and 76 also coupled to the +v line. I couple respective capacitors 78, 80, 82, and 84 across the respective switches PB1-PB4 to provide smooth output transitions when the switches are actuated. Switches PB1-PB4 are coupled to respective lines $\overline{S1}$, $\overline{S2}$, $\overline{S3}$, and $\overline{S4}$, each of which lines is normally at a high logic level but changes to a low logic level when the corresponding switch is actuated to connect the line to ground.

Lines $\overline{S1}$-$\overline{S4}$ feed respective first inputs of two-input NOR gates 86, 88, 90, and 92, the other inputs of which are respectively coupled to the $\overline{A1}$, $\overline{A2}$, $\overline{A3}$, and $\overline{A4}$ lines originating from the decoder 60. Each of the NOR gates 86, 88, 90, and 92 provides a high logic output when the corresponding switch PB1-PB4 is actuated and that switch corresponds to a correct answer. Thus, if switch PB2 is pressed to apply a low logic signal to line $\overline{S2}$ and answer A2 is the correct answer, low-level signals on the $\overline{A2}$ and $\overline{S2}$ lines will cause NOR gate 88 to provide a high logic output. Similarly, each of the other NOR gates 86, 90, and 92 will provide a high output if the corresponding switch is actuated to select a correct answer.

NOR gates 86, 88, 90, and 92 feed respective inverters 94, 96, 98, and 100, the outputs of which feed the input of a NAND gate 102. NAND gate 102 thus provides a high level output whenever a switch corresponding to a correct answer is depressed I apply the output of NAND gate 102 to the data (D) input of a D-type flip-flop 104, the set (S) input of which I disable by tying it to the positive supply line through a resistor 106.

The selector unit S1' also includes means for supplying the flip-flop 104 with a clock signal immediately after the switches PB1-PB4 are first actuated. A NAND gate 108, the inputs of which are coupled to respective lines $\overline{S1}$-$\overline{S4}$, provides a high-level output whenever one or more of the switches PB1-PB4 are actuated to select an answer. A second D-type flip-flop 110 has its S input disabled by being tied to the positive voltage line through a resistor 112 and also has its D input tied to the S input.

Flip-flop 110, which normally provides a low logic output, will thus shift to a high output when the output from NAND gate 108 first goes positive. When flip-flop 110 changes to a high output, a one-shot multivibrator circuit 114 coupled to flip-flop 110 responds by supplying a short negative-going pulse to the clock input of flip-flop 104. Flip-flop 104 is clocked on the trailing or positive-going edge of the signal from circuit 114 to clock in the output from NAND gate 102 a short time, as determined by the width of the pulse from circuit 114, after the switches are first actuated. An inverter 116 responsive to the $\overline{Q}$ or inverted output or flip-flop 104 feeds a light-emitting diode 120 through a resistor 118. If the answer first selected is the correct answer, diode 120 will light up and remain lit until the flip-flop 104 is reset. Once the one-shot circuit 114 has generated a pulse to clock flip-flop 104, that flip-flop is no longer responsive to the output from NAND gate 102. Thus, a student will be unable to effectively make a further selection and the diode 120 will remain lit or unlit, depending on whether the original answer was correct. The selector unit S1' is reset at the end of the question period by the high-level signal generated on line 58 between successive question periods. I couple line 58 through a resistor 122 to a smoothing capacitor 124 coupled to ground and also to the input of an inverter 126. In response to the reset signal on line 58, inverter 126 provides a low logic output resetting flip-flops 104 and 110. Further, during the time between question periods that a high-level signal exists on line 58, flip-flops 104 and 110 are held at reset to prevent the student from effectively actuating the switches PB1 through PB4 during this period.

It will be seen that I have accomplished the objects of my invention. My teaching system is readily adaptable to simultaneous use by a number of students watching a single screen. My system is simple and inexpensive and may be used with existing equipment. It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A teaching system including in combination means for providing a video display containing a multiple-choice question in readable form and the correct answer to said question in encoded form, said video display further indicating the beginning of an answering period, means optically responsive to said display for providing a first signal indicating the correct answer to said question and a second signal indicating the beginning of said answering period, user-actuated means for selecting a possible answer to said question, resettable means responsive to the momentary actuation of said selecting means to select an answer corresponding to said first signal for providing a continuing visual display indicating the selection of a correct answer, resettable means responsive to actuation of said selecting means for inhibiting the responsiveness of said display means to further actuation of said selecting means, and means responsive to said second signal for resetting said display means and said inhibiting means.

2. Apparatus as in claim 1 in which said video display contains a plurality of areas selectively illuminated in a pattern indicating the correct answer and an additional area distinct from said plurality of areas selectively illuminated to indicate the beginning of an answering period.

3. In a teaching system in which a user is called on to select the correct answer to a question having a plurality of possible answers, apparatus including in combination means for providing a first signal indicating the correct answer, means for providing a second signal indicating the beginning of an answering period, user-actuated means for selecting one of said possible answers, a display adapted to be illuminated in response to a first electrical input and to remain unilluminated in response to a second electrical input, first resettable means responsive to the momentary actuation of said selecting means to select an answer corresponding to said first signal for providing said display with a continuing input corresponding to one of said first and second electrical inputs, said means providing said display with a continuing input corresponding to the other of said electrical inputs in response to the momentary actuation of said selecting means to select an answer not corresponding to said first signal, second resettable means responsive to actuation of said selecting means for inhibiting the responsiveness of said first resettable means to further actuation of said selecting means, and means responsive to said second signal for resetting said first resettable means and said second resettable means.

4. Apparatus as in claim 3 in which said first resettable means provides said display with said first electrical input in response to actuation of said selecting means to select an answer corresponding to said first signal.

* * * * *